United States Patent [19]
Olschewski et al.

[11] Patent Number: 4,512,672
[45] Date of Patent: Apr. 23, 1985

[54] FRONT SEAL FOR BEARING CUPS

[75] Inventors: Armin Olschewski; Gerhard Herrmann, both of Schweinfurt; Bernhard Bauer, Hassfurt; Elisabeth Zirk, Dittelbrunn, all of Fed. Rep. of Germany

[73] Assignee: SKF Kugellagerfabriken GmbH, Schweinfurt, Fed. Rep. of Germany

[21] Appl. No.: 491,827

[22] Filed: May 27, 1983

[30] Foreign Application Priority Data

May 6, 1982 [DE] Fed. Rep. of Germany ... 8213146[U]

[51] Int. Cl.³ .............................................. F16C 33/76
[52] U.S. Cl. .................................... 384/477; 384/486; 464/131
[58] Field of Search ................. 308/187, 187.1, 187.2; 384/130, 147, 151; 464/131; 277/94, 95, 212 R, 212 C, 212 F

[56] References Cited

U.S. PATENT DOCUMENTS

| | | | |
|---|---|---|---|
| 3,717,394 | 2/1973 | Pitner | 308/187.1 |
| 3,788,100 | 1/1974 | Pitner | 308/187.1 X |
| 3,906,746 | 9/1975 | Haines | 308/187.2 X |
| 4,154,490 | 5/1979 | Köhler et al. | 308/187.2 |
| 4,312,547 | 1/1982 | Negele et al. | 308/187.1 |
| 4,377,312 | 3/1983 | Zackrisson | 308/187.1 |

*Primary Examiner*—John Petrakes
*Assistant Examiner*—David Werner
*Attorney, Agent, or Firm*—Eugene E. Renz, Jr.

[57] ABSTRACT

Front seal for bearing cups, in particular, for universal joints, having a seal ring arranged on the bearing cup between the bearing cup and a shoulder of the machine component it supports, characterized in that the seal ring (13, 31) is of T-shaped cross section comprising a body portion and a part of axially projecting sealing flanges having bore faces (24, 25, 34, 37) which are arranged adjacent to corresponding outside surfaces (26, 27, 35) of the machine component (2) and the bearing cup (6).

6 Claims, 4 Drawing Figures

FRONT SEAL FOR BEARING CUPS

BACKGROUND OF THE INVENTION

1. Field of the Invention

The present invention relates to front seals for bearing cups and is particularly adapted for use in universal joints, the seal having a seal ring arranged on the bearing cup between the bearing cup and a shoulder of the machine component it supports.

2. Description of the Prior Art

Front seals of the type to which the present invention are generally known and a typical prior art type front seal is that shown in German preliminary application No. 2,144,172. The seal shown in the German publication includes a seal ring which engages with projections behind a rim or collar of the bearing cup so that both parts form a ready to install unit. A disadvantage of this prior assembly is that the rim of the bearing cup to which the seal ring is fastened can only be flanged in the bearing cup after installation of the seal ring whereby a hardening of the rim without causing damage to the race is virtually impossible.

In accordance with another prior art seal ring, of the type shown in German preliminary application No. 2,908,713, the seal assembly includes a sealing disc which is connected with a seal ring arranged in the bore of the bearing cup by an integral annular collar. However, with this prior known seal, it has been found that it is relatively difficult during the assembly process to push the seal disc on that journal of the universal joint without twisting.

SUMMARY OF THE INVENTION

With the foregoing in mind, it is an object of the present invention to provide a front seal characterized by novel features of construction and arrangement which can be easily fabricated and assembled without difficulty including a novel arrangement of sealing faces confronting the bearing which are pressed radially inwardly on the outside surface of the bearing cup when inserting the bearing cup into the eye of the fork. To this end, the front seal comprises an annular member of generally T-shaped cross section having a pair of circumferentially extending axially directed sealing flanges with bore faces arranged adjacent to corresponding outside surfaces of the machine component such as a journal supported in the bearing cup and an outside surface of the bearing cup. By this arrangement, there is assured a good sealing engagement between the bearing cup and the journal of the machine component as supported in the bearing cup and allows for greater tolerances between the elements. In accordance with one of the embodiments illustrated, the inner faces or bore faces of the sealing flanges which act as sealing members are constructed conically so that an optimum fit of the mating faces with the surfaces of the bearing cup and journal is assured.

In accordance with another feature of the present invention, in order to press during installation of the bearing cup one sealing face radially inwardly on the contact surface even in a machine component having a cylindrical contact surface, one of the sealing flanges is provided with an annular radial projection having an inside diameter which is smaller in the uninstalled state than the outside diameter of the cylindrical contact surface.

In accordance with still another feature of the present invention, the seal ring is provided with an integral thrust flange depending from the body portion thereof which thrust flange has a conical bore. This construction guarantees a simple and twist-free mounting of the seal ring on the journal.

BRIEF DESCRIPTION OF THE DRAWINGS

These and other objects of the present invention and the various features and details of the operation and construction of a front seal in accordance with the present invention are hereinafter more fully set forth with reference to the drawings wherein.

DESCRIPTION OF THE PREFERRED EMBODIMENT

Figure 1:
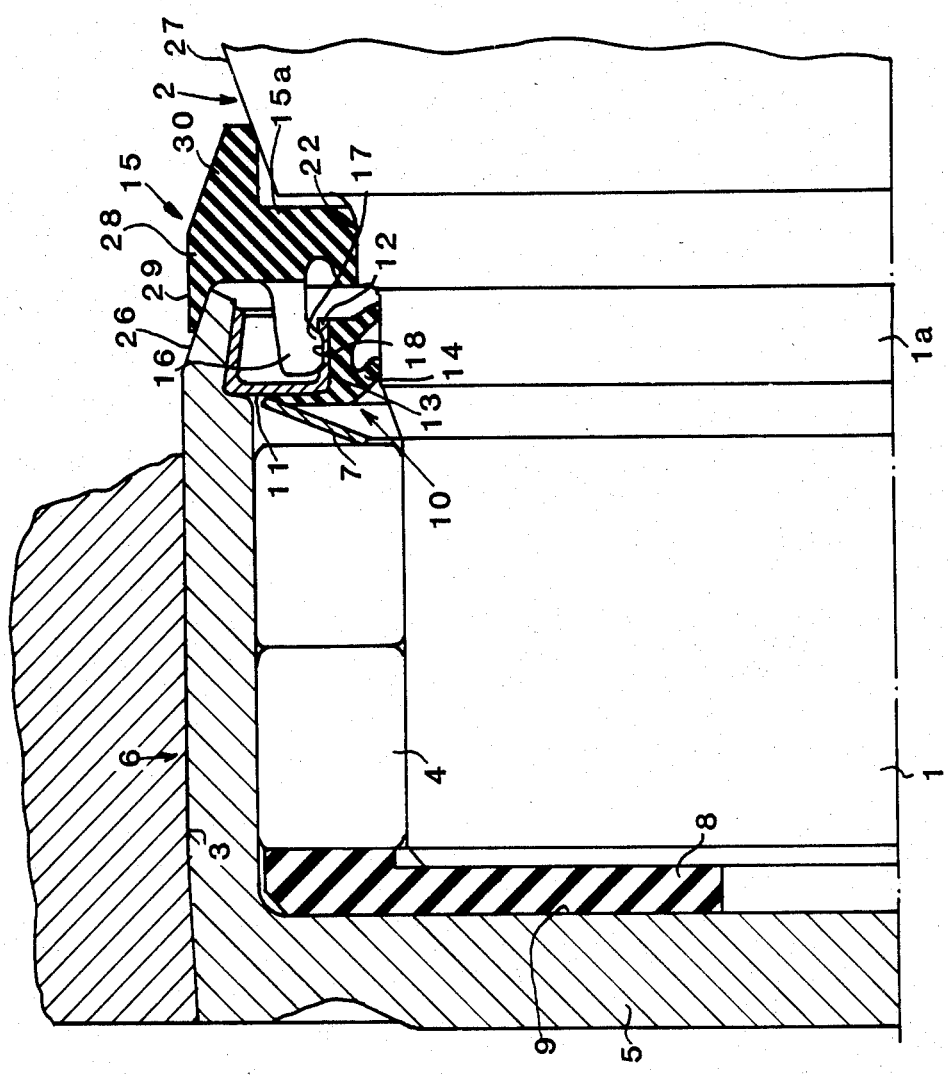
FIG. 1 is a longitudinal sectional view through a bearing cup incorporating a front seal ring in accordance with the present invention.

Referring now to the drawings and particularly to FIG. 1 thereof, there is shown a universal joint assembly incorporating a front seal ring in accordance with the present invention. The journal 1 of the universal joint 2 is rotatably supported in the eyes of the fork eye 3 by means of rolling elements, comprising in the present instance, cylindrical rollers 4 which are arranged in side-by-side rows in a bearing cup 6 of generally U-shaped cross section having a closed bottom 5. A disc type liner 8 made of a low friction material is mounted in the bottom of the bearing cup and a cup spring 7 is provided to bias the rollers 4 against the low friction disc 8 and in this manner serve as an axial support of the journal 1. A seal 10 closes off the open end of the bearing cup which as illustrated comprises an annular thrust ring 11 of U-shaped cross section having axially outwardly directed flanks 12 and a resilient sealing element 13 made, for example, of plastic material molded integrally with the thrust ring 11. The sealing element 13 as illustrated has a pair of axially spaced side by side sealing lips 14 which are angled outwardly and are of conical configuration and engage an enlarged stepped portion 1a of the journal 1.

Figure 2:
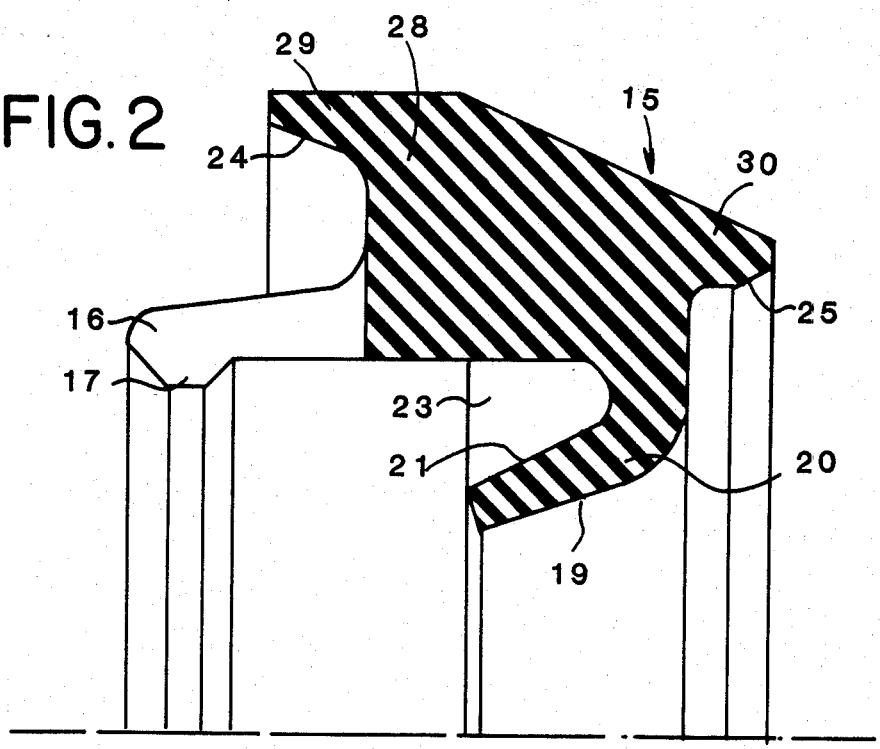
FIG. 2 is an enlarged sectional view showing the seal ring of the seal.
Figure 3:
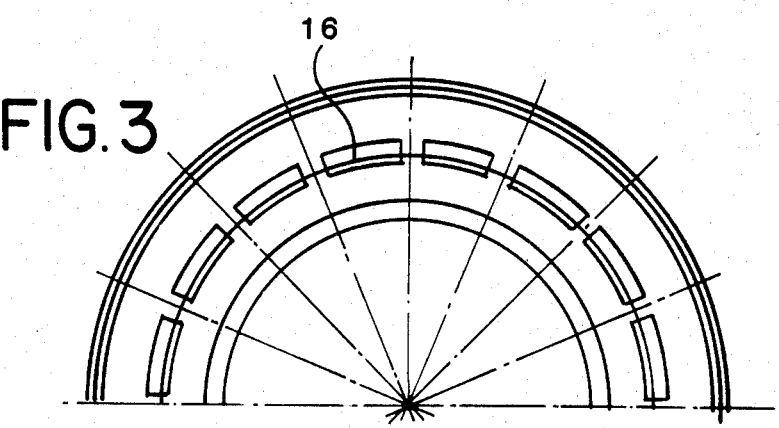
FIG. 3 is a side elevational view of the front seal.

In accordance with the present invention, a front seal ring 15 is provided for the bearing cup which enhances the sealing action of the combination thrust ring and sealing element 13 described above. The front seal ring as best illustrated in FIG. 1 is an annular member of generally T-shaped cross section having a plurality of axially directed, circumferentially spaced, elastic fingers 16 projecting from the radial body portion 15a of the seal, the tip of each of the fingers having radially inwardly directed projection 17 which engage in a groove 18 of the thrust ring 11 so that the bearing cup 6, and seal ring 15 function as an integral front seal assembly. The seal ring 15 as best illustrated in FIG. 2 also has an integral thrust 20 flange depending angularly from the body portion 15a of the seal ring defining a conical bore 19 so that it is flexible in a radial direction by reason of an annular recess 21. The conical bore 19 allows a slight contact pressure of the seal ring on the stepped shoulder 22 of the journal 1 during installation of the bearing cup 6 while in a radial direction even greater tolerances in diameter of the journal 1 are bridged as a result of the elastic construction of the thrust flange 20. A series of circumferentially spaced wall portions 23 bridge the gap between the lower terminal end of the body portion 15a and the inner conical surface 21 of the thrust flange 20 to provide stiffening means for the thrust flange, the walls 23, however, being flexible and therefore displaceable in the annular recess 21.

The seal ring 15 has as illustrated circumferentially extending axially directed sealing flanges or lips 29 and 30 which project an opposite directions from the outer portion of the body portion 15a. The bores defined by the flanges 29 and 30 are outwardly convergent to define conical sealing faces 24 and 25 which as illustrated in FIG. 1 engage complementary conical outer surfaces 26 and 27 of the bearing cup 6 and the journal 1. In order to ensure positive contact between the bore face 24 of the seal ring with the outer conical surface 26 of the sealing cup, the bore face 25 of the seal ring 15 is flared out during installation of the bearing cup 6 in the eye of the fork 3; the section 28 of the seal ring is tilted and the seal lip 29 is pressed radially inward on the outside face 26. The final alignment of the front seal takes place when the bearing is lubricated. In this process, the lubricant is introduced into the annular recess 21 above the thrust flange 20 and this flange is then pressed against the journal 1. Excess lubricant migrates to the area outside the bearing through the gap between the bore face 24 of the seal ring 15 and the outside conical surface 26 of the bearing cup formed by a bulging of the seal lip 29. The flange 30 of the seal ring is pressed more firmly on the outer conical surface 27 of the universal joint 22 and thus penetration of sprayed water or the like is prevented.

Figure 4:
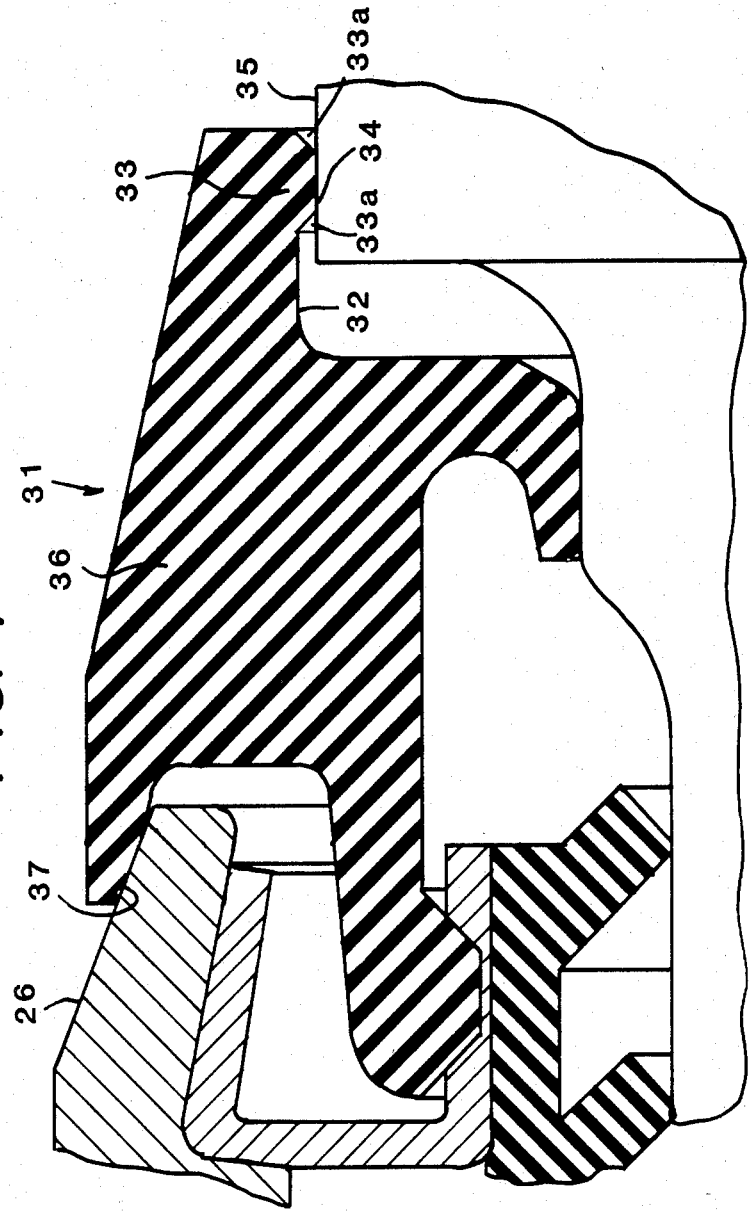
FIG. 4 shows another embodiment of front seal in accordance with the present invention.

There is illustrated in FIG. 4 a modified form of front seal in accordance with the present invention. The seal ring is of generally similar construction to the previously described embodiment. However, in the present instance, the largest shoulder 35 of the trunion is cylindrical and the seal ring 31 has a circumferentially extending radially inwardly directed rib or projection 33 with tapered or feathered outer edges 33a and the bore 34 defined by the rib 33 is smaller in diameter than the outer diameter of the cylindrical shoulder 35 in the uninstalled state. Accordingly, when pressing the bearing cup into the eye of the fork 3, the seal ring is pushed only to engage the outer cylindrical surface 35 of the universal joint 2 and by this action, the section 36 of the seal ring is tilted and the bore face 37 is pressed with positive contact against the conical outer surface 26 of the bearing cup 6.

Even though while particular embodiments of the present invention have been illustrated and described herein, it is not intended to limit the invention and changes and modifications may be made therein within the scope of the following claims.

We claim:

1. A seal for sealing the space between a shaft member having first and second circumferentially extending seating surfaces, the second seating surface being tapered and a cup member having an oppositely tapered circumferentially extending third seating surface formed adjacent the open end of the cup member, said seal comprising a member made of an elastic material of generally T-shaped cross section defining a body portion having a pair of oppositely directed sealing flanges projecting generally axially from said body portion and engageable with the second and third seating surfaces of the shaft member and cup member respectively, and wherein engagement of one of said sealing flanges with the second seating surface of the shaft effects a tilting action of said seal and a postiive sealing contact of said other sealing flange against the third seating surface of the cup member, said body portion seating on the first seating surface of the shaft member.

2. A seal for sealing the space between a shaft member having first and second circumferentially extending seating surfaces and a cup member having a tapered circumferentially extending third seating surface formed adjacent the open end of the cup member, said seal comprising a member made of an elastic material of generally T-shaped cross section defining a body portion having a pair of oppositely directed sealing flanges projecting generally axially from said body portion and engageable with the second and third seating surfaces of the shaft member and cup respectively, the outer diameter of the second seating surface being greater than the inner diameter of one of the flanges so that engagement of said one sealing flange with the second seating surface of the shaft effects a tilting action of said seal and a positive sealing contact of said other sealing flange against the third seating surface, said body portion seating on the first seating surface of the shaft member.

3. A seal as claimed in claim 1 including a plurality of elastic fingers projecting axially from said body portion and engageable in a groove formed in a thrust ring seated in the open end of the cup member so that the cup and seal function as an integral assembly.

4. A seal as claimed in claim 3 including a resilient sealing element molded integrally with said thurst ring and sealingly engaging the shaft member.

5. A seal as claimed in claim 1 including a thrust flange formed integrally with said body portion depending angularly therefrom at the end of said body portion remote from said sealing flanges adapted to resiliently engage the first sealing surface of the shaft member.

6. A seal as claimed in claim 1 wherein inner bore surfaces of the sealing flanges are tapered in opposite directions to complement the oppositely tapered surfaces of the shaft and cup respectively.

* * * * *